United States Patent
Kao et al.

(10) Patent No.: US 11,836,948 B2
(45) Date of Patent: Dec. 5, 2023

(54) IMAGE CALIBRATION METHOD AND IMAGE CALIBRATION DEVICE

(71) Applicant: VIVOTEK INC., New Taipei (TW)

(72) Inventors: Chung-Yi Kao, New Taipei (TW); Shih-Hsuan Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 233 days.

(21) Appl. No.: 17/228,734

(22) Filed: Apr. 13, 2021

(65) Prior Publication Data
US 2021/0335009 A1 Oct. 28, 2021

(30) Foreign Application Priority Data
Apr. 27, 2020 (TW) ................................. 109113997

(51) Int. Cl.
*G06T 7/80* (2017.01)
*G06T 7/00* (2017.01)
*G06T 5/50* (2006.01)
*G06T 7/90* (2017.01)

(52) U.S. Cl.
CPC ............... *G06T 7/80* (2017.01); *G06T 5/50* (2013.01); *G06T 7/90* (2017.01); *G06T 7/97* (2017.01); *G06T 2207/10024* (2013.01); *G06T 2207/20221* (2013.01)

(58) Field of Classification Search
CPC .... G06T 7/80; G06T 5/50; G06T 7/90; G06T 7/97; G06T 2207/10024; G06T 2207/20221
See application file for complete search history.

(56) References Cited

U.S. PATENT DOCUMENTS

| | | | | |
|---|---|---|---|---|
| 9,838,614 | B1* | 12/2017 | Brailovskiy | H04N 5/265 |
| 2015/0103157 | A1* | 4/2015 | Hsu | H04N 1/3876 |
| | | | | 348/79 |
| 2017/0352138 | A1* | 12/2017 | Wang | G06T 5/009 |
| 2018/0082454 | A1* | 3/2018 | Sahu | G06T 3/4038 |
| 2019/0356873 | A1* | 11/2019 | Douady-Pleven | G06T 5/50 |
| 2021/0243368 | A1* | 8/2021 | Park | H04N 23/51 |

FOREIGN PATENT DOCUMENTS

| CN | 105894449 A | 8/2016 |
|---|---|---|
| CN | 109672847 A | 4/2019 |

* cited by examiner

*Primary Examiner* — Oneal R Mistry
*Assistant Examiner* — Vaisali Rao Koppolu
(74) *Attorney, Agent, or Firm* — Winston Hsu

(57) ABSTRACT

An image calibration method applied to an image calibration device includes comparing a first image with a second image to acquire a first overlapping region of the first image and a second overlapping region of the second image, analyzing color distribution of the first overlapping region to acquire at least one first base color value, analyzing color distribution of the second overlapping region to acquire at least one second base color value, setting a ratio of the at least one first base color value to the at least one second base color value as an luminance compensation value when the at least one first base color value is greater than the at least one second base color value, and utilizing the luminance compensation value to adjust pixels of the second image. The first overlapping region is overlapped with the second overlapping region.

20 Claims, 9 Drawing Sheets

IMAGE CALIBRATION METHOD AND IMAGE CALIBRATION DEVICE

BACKGROUND OF THE INVENTION

1. Field of the Invention

The present invention relates to an image calibration method and an image calibration device, and more particularly, to an image calibration method and a related image calibration device capable of effectively increasing image feature continuity.

2. Description of the Prior Art

With an advanced technology, the conventional surveillance camera has several image receivers adapted to capture a plurality of small dimensional monitoring images in different fields of view, and the plurality of small dimensional monitoring images are stitched to form a panoramic image containing a large dimensional scene. The plurality of small dimensional monitoring images is partly overlapped with each other. An overlapped region between two adjacent monitoring images is detected to search at least one feature that appears in the overlapped region of the two adjacent monitoring images, and the feature is used to stitch the adjacent monitoring images. However, each image receiver of the conventional surveillance camera has unique hardware and software setting, so that the plurality of small dimensional monitoring images captured by the image receivers cannot have the same image parameters in luminance, contrast and saturation even if all the image receivers are designed by similar hardware and software. A vestige of stitching line is clearly found in the panoramic image generated by the small dimensional monitoring images via conventional image stitching technology, and results in inartistic appearance of the panoramic image. Design of an image calibration method capable of eliminating the stitching vestige and increasing image feature continuity is an important issue in the surveillance camera industry.

SUMMARY OF THE INVENTION

The present invention provides an image calibration method and a related image calibration device capable of effectively increasing image feature continuity for solving above drawbacks.

According to the claimed invention, an image calibration method includes comparing a first image with a second image to acquire a first overlapping region of the first image and a second overlapping region of the second image, analyzing color distribution of the first overlapping region to acquire at least one first base color value, analyzing color distribution of the second overlapping region to acquire at least one second base color value, setting a ratio of the at least one first base color value to the at least one second base color value as an luminance compensation value when the at least one first base color value is greater than the at least one second base color value, and utilizing the luminance compensation value to adjust pixels of the second image. The first overlapping region is overlapped with the second overlapping region According to the claimed invention, an image calibration method includes comparing a first image with a second image to acquire a first overlapping region of the first image and a second overlapping region of the second image, computing a first aberration ratio of two first base color values with different color inside the first overlapping region, computing a second aberration ratio of two second base color values with different color inside the second overlapping region, acquiring an aberration compensation value via the first aberration ratio and the second aberration ratio, and utilizing the aberration compensation value to respectively adjust at least one first selected base color value from a plurality of first base color values contained by the first image and at least one second selected base color value from a plurality of second base color values contained by the second image. The first selected base color and the second selected base color value have the same color, and the first overlapping region is overlapped with the second overlapping region According to the claimed invention, an image calibration device includes an image receiver and an operational processor. The image receiver is adapted to receive a first image and a second image. The operational processor is electrically connected to the image receiver, and adapted to compare a first image with a second image to acquire a first overlapping region of the first image and a second overlapping region of the second image, analyze color distribution of the first overlapping region to acquire at least one first base color value, analyze color distribution of the second overlapping region to acquire at least one second base color value, set a ratio of the at least one first base color value to the at least one second base color value as an luminance compensation value when the at least one first base color value is greater than the at least one second base color value, and utilize the luminance compensation value to adjust pixels of the second image. The first overlapping region is overlapped with the second overlapping region.

According to the claimed invention, an image calibration device includes an image receiver and an operational processor. The image receiver is adapted to receive a first image and a second image. The operational processor is electrically connected to the image receiver, and adapted to compare a first image with a second image to acquire a first overlapping region of the first image and a second overlapping region of the second image, compute a first aberration ratio of two first base color values with different color inside the first overlapping region, compute a second aberration ratio of two second base color values with different color inside the second overlapping region, acquire an aberration compensation value via the first aberration ratio and the second aberration ratio, and utilize the aberration compensation value to respectively adjust at least one first selected base color value from a plurality of first base color values contained by the first image and at least one second selected base color value from a plurality of second base color values contained by the second image. The first overlapping region is overlapped with the second overlapping region, and the first selected base color and the second selected base color value have the same color.

The image calibration method and the image calibration device of the present invention can acquire the overlapping regions inside the two images, and analyze the color distribution within the overlapping regions, so as to regulate the base color value of all pixels inside the two images in accordance with the ratio of two identical base color values inside different overlapping regions or in accordance with the ratio of two different base color values inside the same overlapping regions, for setting parameter unity in the stitching image. The embodiment disclosed in the present invention can adjust the image luminance and then the image aberration, or only adjust the image luminance, or only adjust the image aberration, or compensate the image luminance and/or the image aberration via other image parameters which are useful for eliminating the stitching vestige. In conclusion, when the adjacent images are stitched, the present invention can calibrate the luminance and the aberration of a center and surroundings inside the stitching image after two, and then execute modification of the luminance and the aberration based on the calibrated stitching image for effectively eliminating the stitching vestige.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
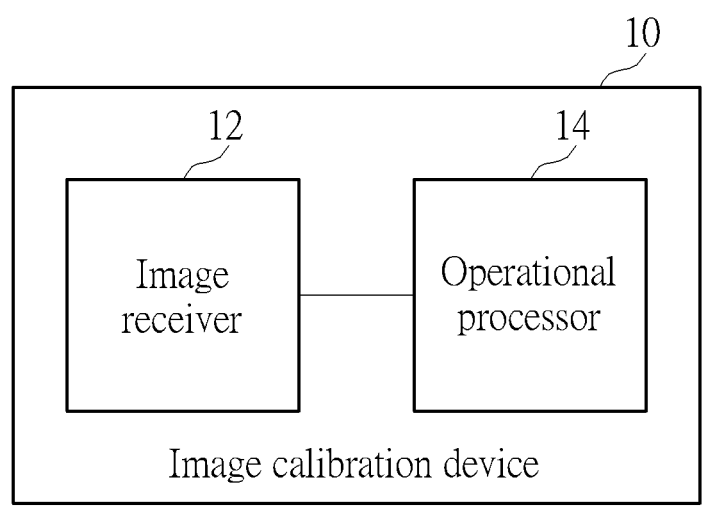
FIG. 1 is a functional block diagram of an image calibration device according to an embodiment of the present invention.
Figure 2:
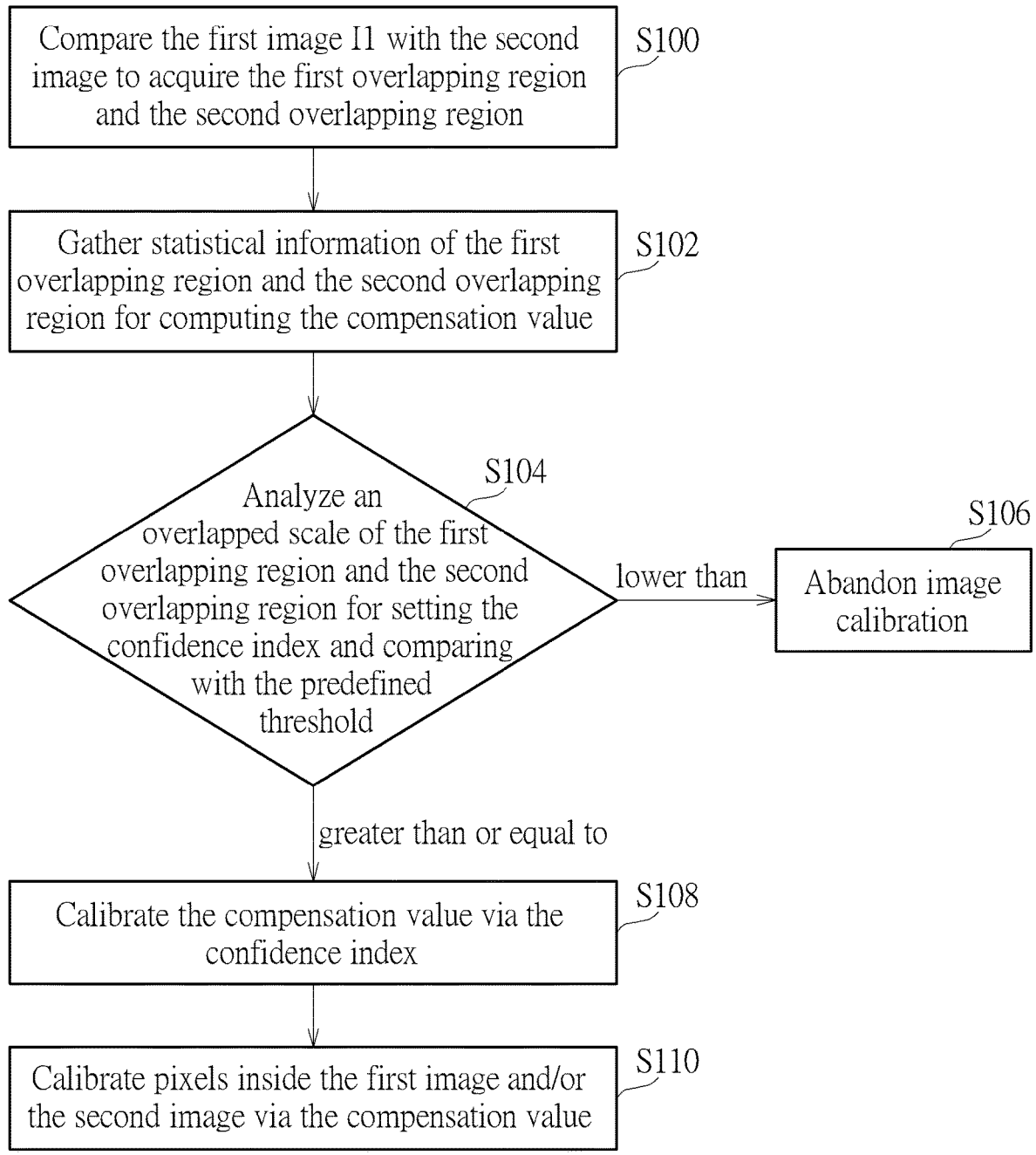
FIG. 2 is a flow chart of an image calibration method according to the embodiment of the present invention.

Please refer to FIG. 1 and FIG. 2. FIG. 1 is a functional block diagram of an image calibration device 10 according to an embodiment of the present invention. FIG. 2 is a flow chart of an image calibration method according to the embodiment of the present invention. The image calibration device 10 can be a surveillance apparatus used to detect a surveillance region with large dimensions. The image calibration device 10 can capture several surveillance images with different fields of view, or receive several surveillance images captured by an external camera, and the surveillance image can be stitched tor form a stitching image with a panoramic characteristic. The image calibration device 10 can include an image receiver 12 and an operational processor 14. The image receiver 12 may capture a plurality of images, or receive the plurality of images whose surveillance regions are partly overlapped in a wireless manner or in a wire manner. The operational processor 14 can be electrically connected to the image receiver 12, and execute the image calibration method to remove a stitching vestige for increasing brightness and/or color saturation of the stitching image.

Figure 3:
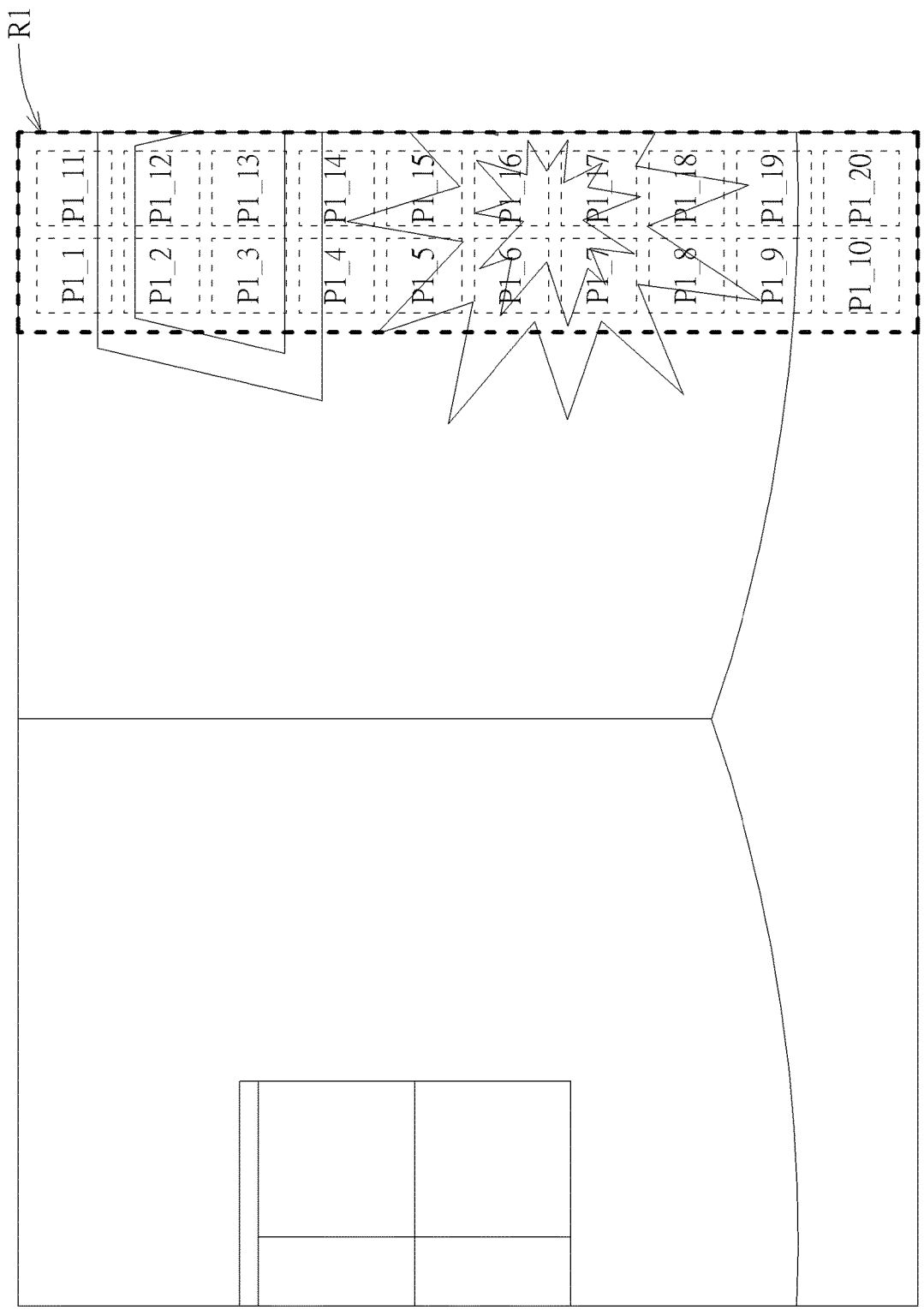
FIG. 3 and FIG. 4 are diagrams of a first image and a second image according to the embodiment of the present invention.
Figure 4:
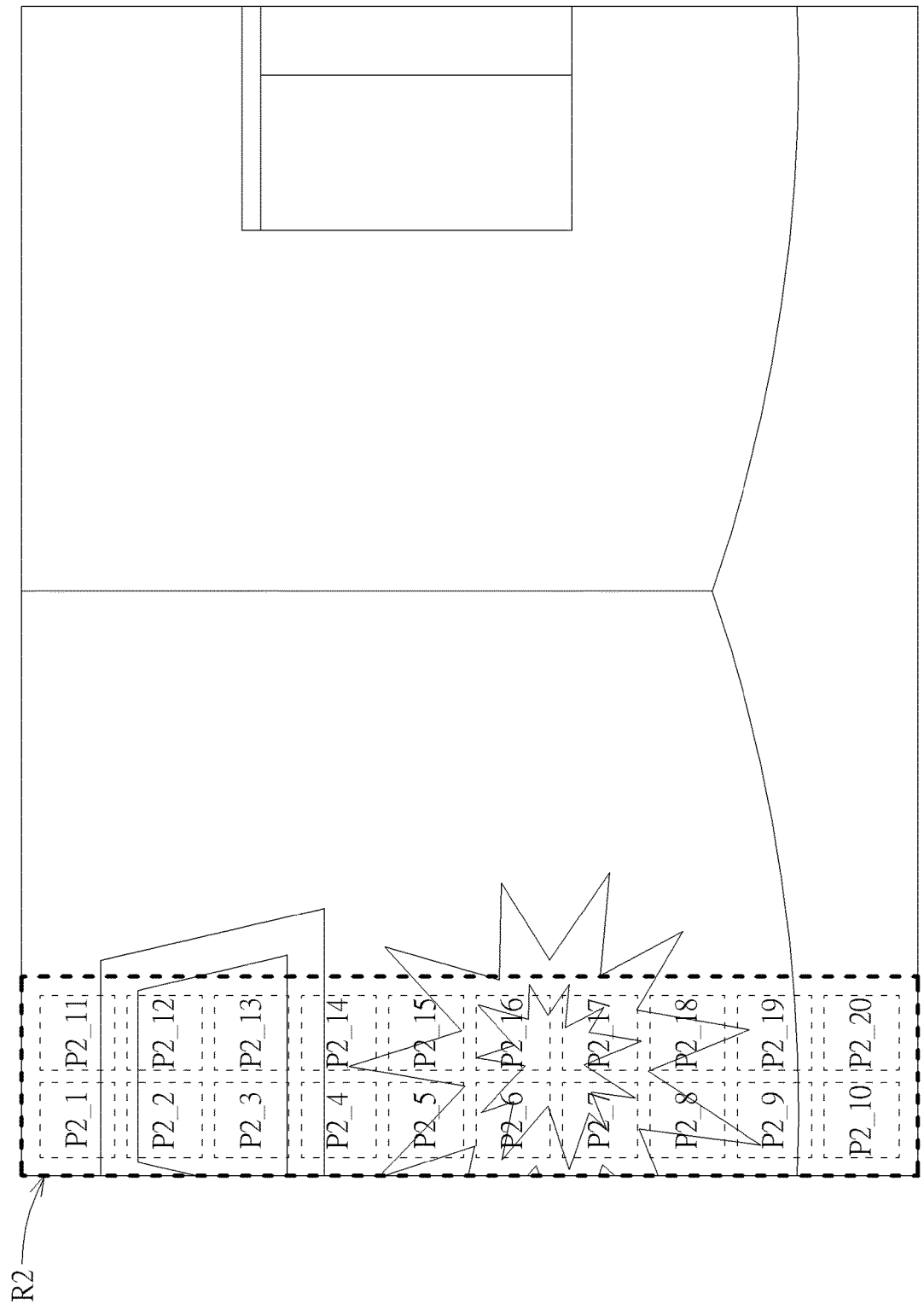
Figure 5:
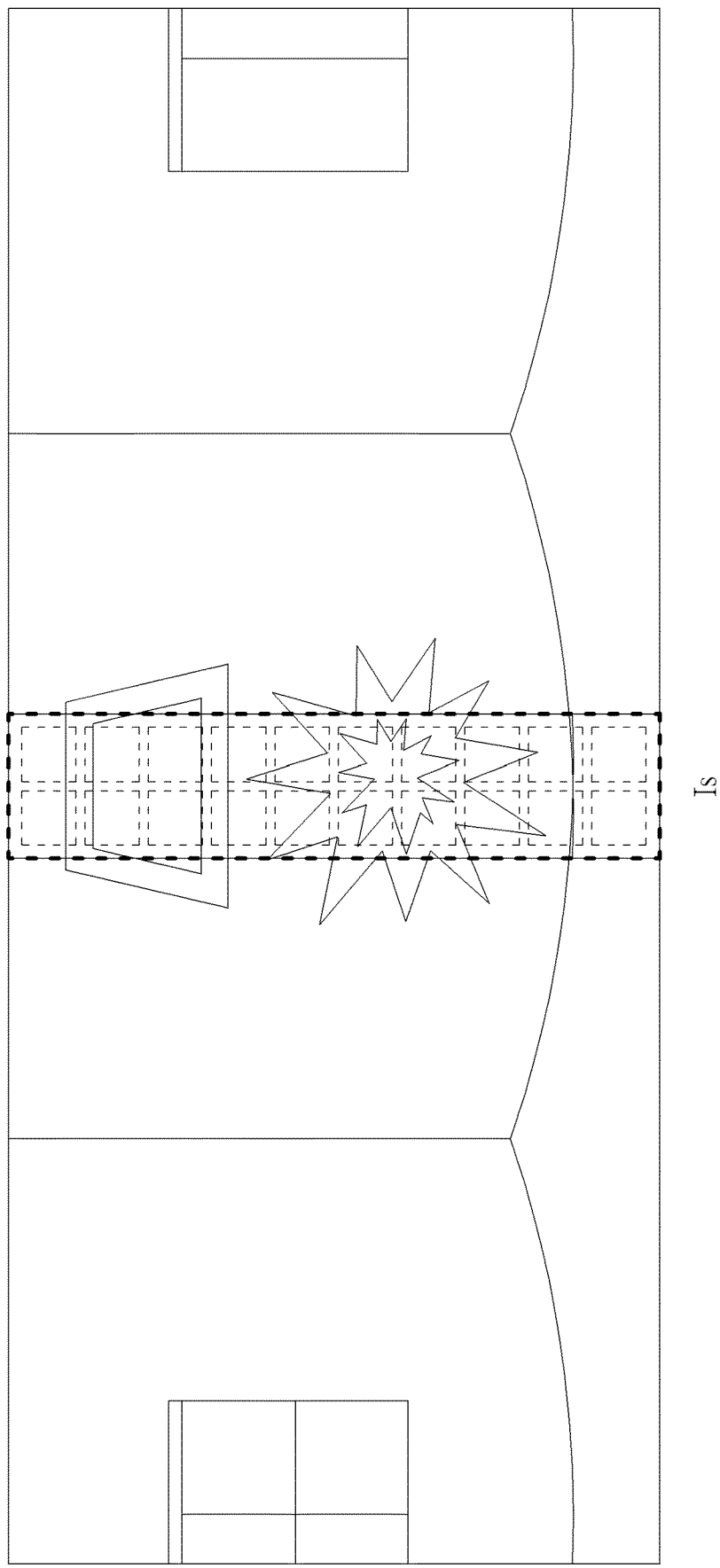
FIG. 5 is a diagram of the stitching image according to the embodiment of the present invention.

Please refer to FIG. 2 to FIG. 5. FIG. 3 and FIG. 4 are diagrams of a first image I1 and a second image I2 according to the embodiment of the present invention. FIG. 5 is a diagram of the stitching image Is according to the embodiment of the present invention. The image calibration device 10 can stitch and calibrate two images having the surveillance regions adjacent to and partly overlapped with each other; for example, the first image I1 and the second image I2 can be stitched to form the stitching image Is. The first image I1 and the second image I2 are captured by different cameras, so that the brightness and/or the color saturation of the first image I1 is different from ones of the second image I2, and the image calibration method of the present invention can be used to eliminate the stitching vestige on the stitching image Is formed by the first image I1 and the second image I2. First, step S100 can be executed to compare the first image I1 with the second image I2 to acquire a first overlapping region R1 and a second overlapping region R2. The first overlapping region R1 of the first image I1 can be overlapped with the second overlapping region R2 of the second image I2. Then, step S102 can be executed to gather statistical information of the first overlapping region R1 and the second overlapping region R2 for computing a compensation value of image parameters. The said image parameters can be the brightness or the color saturation of the image, or any parameter capable of eliminating the stitching vestige, which depends on a design demand.

Then, step S104 can be executed to analyze an overlapped scale of the first overlapping region R1 and the second overlapping region R2 for setting a confidence index. If the confidence index is smaller than a first predefined threshold, the overlapped scale and a stitching efficacy of the first image I1 and the second image I2 are interpreted as being unacceptable, and step S106 can be executed to abandon image calibration. If the confidence index is greater than or equal to the first predefined threshold, step S108 and step S110 can be executed to calibrate the image parameter compensation value via the confidence index, and then calibrate pixels inside the first image I1 and/or the second image I2 via the image parameter compensation value, so as to eliminate the stitching vestige on the panoramic image for preferred stitching continuity between the first image I1 and the second image I2. Execution of setting the confidence index is an optional step, and therefore step S100 may be executed after execution of step S102, which means the image parameter compensation value can be computed and then directly used to adjust the pixels of the first image I1 and/or the second image I2. It should be mentioned that the confidence index can be further compared with a second predefined threshold, and an adjustment scale of the image parameter compensation value affected by the confidence index can be considered by the overlapped scale of the first overlapping region R1 and the second overlapping region R2, which may be resulted from a comparison result between the confidence index and the second predefined threshold.

For example, if the overlapped scale of the first overlapping region R1 and the second overlapping region R2 is lower than twenty percent, the image calibration method may not execute stitching and calibration of the first image I1 and the second image I2; in the meantime, the overlapped scale (which means the said twenty percent) can be interpreted as the first predefined threshold. If the overlapped scale is higher than twenty percent but smaller than fifty percent, the overlapped scale of the first overlapping region R1 and the second overlapping region R2 may conform to a predefined calibration standard but still lacks for image quality, so that the image calibration method can set the confidence index as a low weighting value, and the image parameter compensation value can be regulated by the low weighting value to be a final compensation value of the first image I1 and/or the second image I2; meanwhile, the overlapped scale (which means the said fifty percent) can be interpreted as the second predefined threshold. If the overlapped scale is higher than fifty percent, the overlapped scale of the first overlapping region R1 and the second overlapping region R2 may conform to an optimal calibration standard, so that the image calibration method can set the confidence index as a high weighting value, and the image parameter compensation value can be regulated by the high weighting value to be the final compensation value of the first image I1 and/or the second image I2.

In step S100, the image calibration method can compute one or several first computed values about any first pixel unit (such as the pixel unit P1_3 shown in FIG. 3) and an adjacent first pixel unit (such as the pixels units P1_2, P1_4, P1_12, P1_13 and P1_14 shown in FIG. 3) inside the first overlapping region R1, and further compute one or several second computed values about a second pixel unit whose position corresponds to position of the foresaid first pixel unit (such as the pixel unit P2_3 shown in FIG. 4) and an adjacent second pixel unit (such as the pixel units P2_2, P2_4, P2_12, P2_13 and P2_14 shown in FIG. 4) inside the second overlapping region R2. The first computed value can be a ratio of the central first pixel unit (such as the pixel unit P1_3) to the surrounding first pixel unit (such as the pixel units P1_2, P1_4, P1_12, P1_13 and P1_14); accordingly, the second computed value can be acquired by the same computation. The first computed value and the second computed value are not limited to the foresaid ratio of two pixel units, and may be another ratio of one weighted pixel unit to another weighted pixel unit, or a difference value between the two pixel units, which depends on the design demand.

If difference between one or several first computed values (such as the ratio of the pixel unit P1_3 to the pixel unit P1_4) and the corresponding second computed value (such as the ratio of the pixel unit P2_3 to the pixel unit P2_4) is smaller than a predefined threshold, coordinates of the first pixel unit P1_3 inside the first overlapping region R1 can be matched with coordinates of the second pixel unit P2_3 inside the second overlapping region R2. Thus, numbers of the first pixel unit and the second pixel unit whose coordinates respectively inside the first overlapping region R1 and the second overlapping region R2 are overlapped can be decided via above-mentioned process. It should be mentioned that the first pixel unit and the second pixel unit can respectively be one single pixel point inside the first image I1 and the second image I2, or can be a pixel block composed of several pixel points inside the first image I1 and the second image I2; the image calibration device 10 can define a range of the pixel unit in accordance with demands of a computation speed and an accuracy.

In step S104, the image calibration method can compute the number of the first pixel unit which conforms to a condition of the coordinates of the first pixel unit inside the first overlapping region R1 being matched with the coordinates of the second pixel unit inside the second overlapping region R2. As shown in FIG. 3 and FIG. 4, the first overlapping region R1 may have twenty first pixel units P1_1~P1_20, and the second overlapping region R2 may have twenty second pixel units P2_1~P2_20. If only three sets of the first pixel unit and the second pixel unit conform to the said condition, the overlapped scale of the first overlapping region R1 and the second overlapping region R2 is lower than twenty percent (which means the first predefined threshold), the image calibration method does not execute the stitching and calibration of the first image I1 and the second image I2. If eight sets of the first pixel unit and the second pixel unit conform to the said condition, the overlapped scale of the first overlapping region R1 and the second overlapping region R2 is higher than twenty percent but lower than fifty percent (which means the second predefined threshold), the confidence index can be the low weighting value accordingly set as 0.4; if sixteen sets of the first pixel unit and the second pixel unit conform to the said condition, the overlapped scale of the first overlapping region R1 and the second overlapping region R2 is higher than fifty percent, the confidence index can be the high weighting value accordingly set as 0.8.

Setting of the confidence index is not limited to the above-mentioned embodiment, such as the ratio of the number of the pixel units that conforms to the predefined condition to a total number of the pixel units inside the overlapping region. In other possible embodiment, the image calibration method of the present invention can set the confidence index as the low weighting value with an invariable numeral (such as the value 0.5) when the overlapped scale is higher than the first predefined threshold and lower than the second predefined threshold, and further can set the confidence index as the high weighting value with another invariable numeral (such as the value 1.0) when the overlapped scale is higher than the second predefined threshold, which depends on the design demand, and a detailed description is omitted herein for simplicity.

Figure 6:
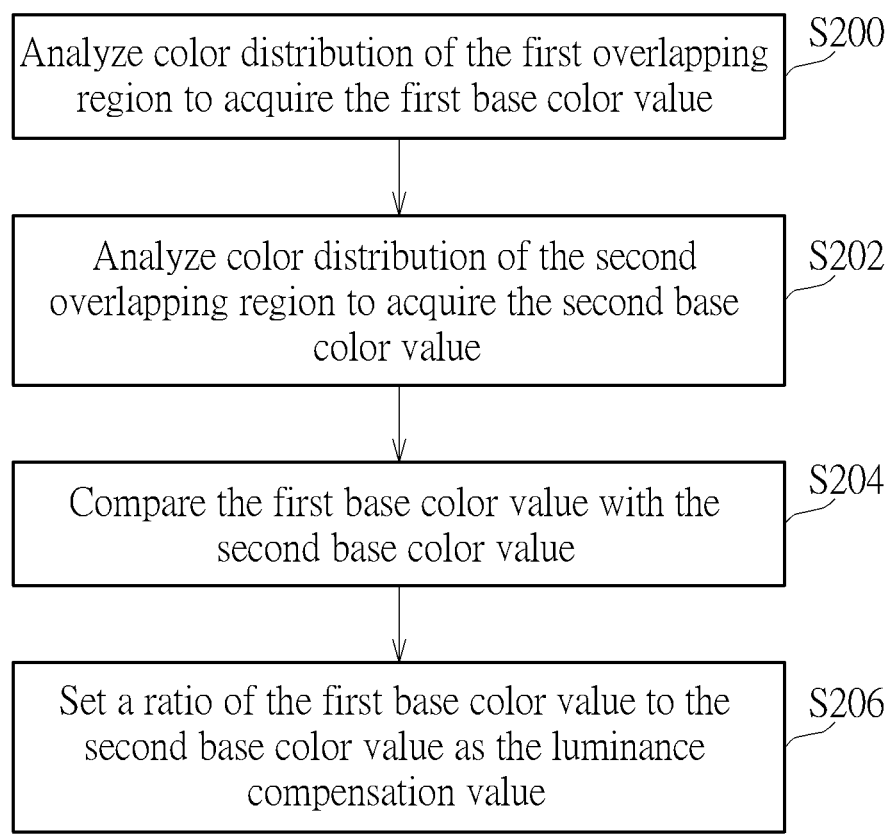
FIG. 6 is a flow chart of computing the luminance compensation value according to the embodiment of the present invention.
Figure 7:
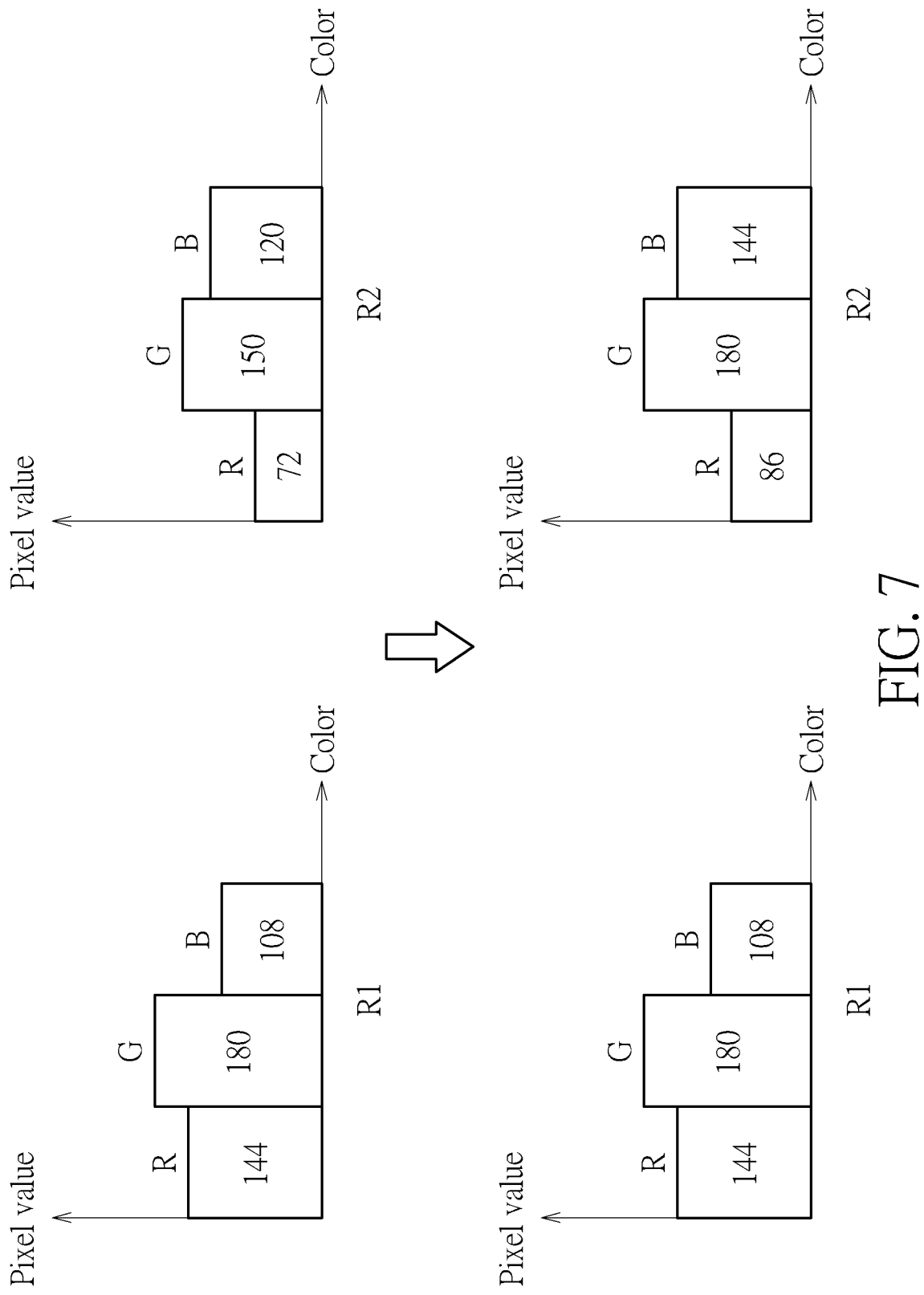
FIG. 7 is a diagram of color distribution of the first overlapping region and the second overlapping region in luminance adjustment according to the embodiment of the present invention.

Step S102 can include computation of an luminance compensation value and an aberration compensation value. Please refer to FIG. 6 to FIG. 7. FIG. 6 is a flow chart of computing the luminance compensation value according to the embodiment of the present invention. FIG. 7 is a diagram of color distribution of the first overlapping region R1 and the second overlapping region R2 in luminance adjustment according to the embodiment of the present invention. When the first overlapping region R1 and the second overlapping region R2 are acquired respectively from the first image I1 and the second image I2, step S200 and step S202 can be executed to analyze the color distribution of the first overlapping region R1 for acquiring at least one first base color value, and analyze the color distribution of the second overlapping region R2 for acquiring at least one second base color value. Then, step S204 and S206 can be executed to compare the first base color value with the second base color value, and set a ratio of the first base color value to the second base color value as the luminance compensation value if the first base color value is greater than the second base color value. It should be mentioned that the first base color value can be a dividend, and the second base color value can be a divisor. The luminance compensation value can be applied to step S110 for adjusting the pixels inside the second image I2.

Generally, the present invention can compute a total value or an average value of the red color value, the green color value and the blue color value of all pixels inside the first overlapping region R1 and the second overlapping region R2, and define the green color value as the first base color value (such as the green color value 180) and the second base color value (such as the green color value 150) as mentioned above, so as to accurately compute the luminance compensation value via low computation; in the meantime, the luminance compensation value can be computed as a value 1.2 (such the ratio 1.2=180/150). The second red color value of the second overlapping region R2 or the second image I2 can be regulated from a value 72 to another value 86 (which is a product of the value 72 and the ratio 1.2) via the luminance compensation value, and the second blue color value of the second overlapping region R2 or the second image I2 can be adjusted from a value 120 to another value 144 (which is a product of the value 120 and the ratio 1.2) via the luminance compensation value. If software and hardware of the image calibration device 10 are sufficient for complicated computation, the first base color value and the second base color value further can be luminance values computed by the red color value, the green color value and the blue color value via specific proportion. For example, the first base color value and the second base color value may be defined as luminance (Luma, Y), and the luminance Y can be computed by three base color values and formula 1.

$$Y=0.299 \times R+0.587 \times G+0.114 \times B \quad \text{Formula 1}$$

Figure 8:
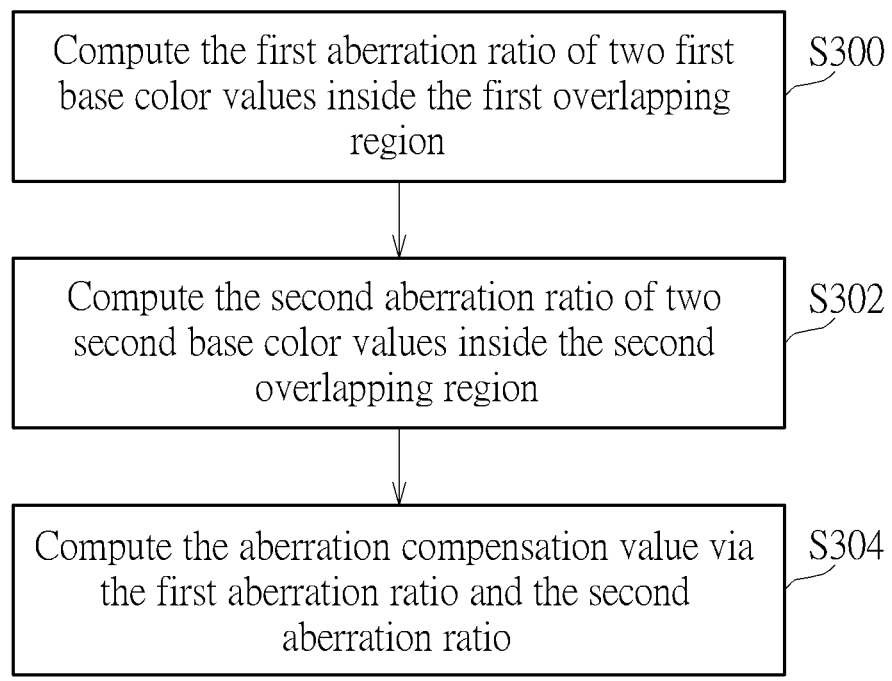
FIG. 8 is a flow chart of computing the aberration compensation value according to the embodiment of the present invention.
Figure 9:
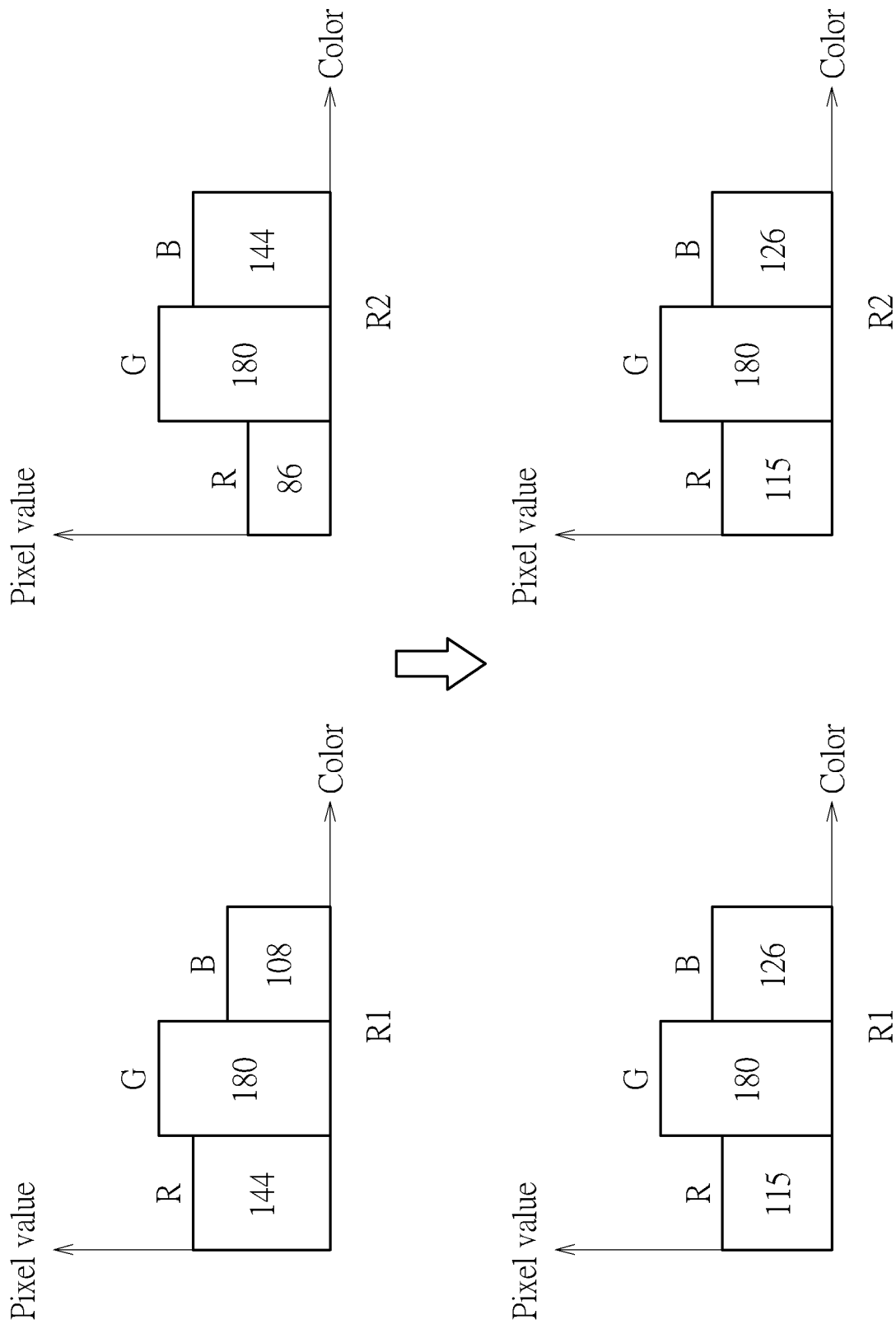
FIG. 9 is a diagram of the color distribution of the first overlapping region and the second overlapping region in aberration adjustment according to the embodiment of the present invention.

Please refer to FIG. 8 and FIG. 9. FIG. 8 is a flow chart of computing the aberration compensation value according to the embodiment of the present invention. FIG. 9 is a diagram of the color distribution of the first overlapping region R1 and the second overlapping region R2 in aberration adjustment according to the embodiment of the present invention. When the first overlapping region R1 and the second overlapping region R2 are respectively acquired from the first image I1 and the second image I2, step S300 and step S302 can be executed to compute a first aberration ratio of one first base color value to another first base color value inside the first overlapping region R1, and further to compute a second aberration ratio of one second base color value to another second base color value inside the second overlapping region R2. The first overlapping region R1 can have three first base color values, and the second overlapping region R2 can have three second base color values, such as the red color value, the green color value and the blue color value. Then, step S304 can be executed to compute the aberration compensation value via the first aberration ratio and the second aberration ratio. The aberration compensation value may be an average value or any other possible transformed value of the two aberration ratios, which depends on an actual demand. Accordingly, the aberration compensation value can be applied to step S110 for adjusting the pixels inside the first image I1 and the second image I2.

The foresaid one first base color value and the foresaid one second base color value have the same color. The foresaid another first base color value and the foresaid another second base color value have the same color. The present invention preferably may compute an aberration ratio of the green color value to the selected red color value or to the selected blue color value inside the first overlapping region R1 and the second overlapping region R2, which depends on the actual demand. As an example shown in FIG. 9, step S300 can compute the first aberration ratio (which is valued as 0.8=144/180) of the first red color value (which is valued as 144) to the first green color value (which is valued as 180), and step S302 can compute the second aberration ratio (which is valued as 0.47=86/180) of the second red color value (which is valued as 86) to the second green color value (which is valued as 180), and step S304 can compute the aberration compensation value (which is valued as 0.64=(0.8+0.47)/2). Then, the aberration compensation value can be used to adjust the base color value of all pixels inside the first image I1 and the second image I2; for example, the first red color value of each pixel inside the first image I1 and the second red color value of each pixel inside the second image I2 can be regulated by the aberration compensation value. In addition, the first blue color value of each pixel inside the first image I1 and the second blue color value of each pixel inside the second image I2 can be regulated by the related aberration compensation value computed in the same manner. The foresaid regulation may acquire one product of the first red color value of each pixel inside the first image I1 and the computed aberration compensation value, and further acquire another product of the second red color value of each pixel inside the second image I2 and the computed aberration compensation value, and replace the original first red color value of each pixel inside the first image I1 by the said one product (such as a value 115=180*0.64) and replace the original second red color value of each pixel inside the second image I2 by the said another product. The blue color value and other color value of all pixels inside the first image I1 and the second image I2 can be regulated in an above-mentioned manner. The base color values of the present invention are not limited to the foresaid red, green and blue color.

In analysis of the color distribution of the first overlapping region R1 and the second overlapping region R2, the present invention can choose all pixels inside the first overlapping region R1 and the second overlapping region R2 for base color distribution statistics, or choose and utilizes some first pixel units inside the first overlapping region R1 and some second pixel units inside the second overlapping region R2 which conform to an overlapped condition for the base color distribution statistics. Application of choosing pixels for the base color distribution statistics is not limited to the above-mentioned embodiments, and depends on the design demand.

The image calibration method and the image calibration device of the present invention can acquire the overlapping regions inside the two images, and analyze the color distribution within the overlapping regions, so as to regulate the base color value of all pixels inside the two images in accordance with the ratio of two identical base color values inside different overlapping regions or in accordance with the ratio of two different base color values inside the same overlapping regions, for setting parameter unity in the stitching image. The embodiment disclosed in the present invention can adjust the image luminance and then the image aberration, or only adjust the image luminance, or only adjust the image aberration, or compensate the image luminance and/or the image aberration via other image parameters which are useful for eliminating the stitching vestige. In conclusion, when the adjacent images are stitched, the present invention can calibrate the luminance and the aberration of a center and surroundings inside the stitching image after two, and then execute modification of the luminance and the aberration based on the calibrated stitching image for effectively eliminating the stitching vestige.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image calibration method, comprising:
   comparing a first image with a second image to acquire a first overlapping region of the first image and a second overlapping region of the second image, wherein the first overlapping region is overlapped with the second overlapping region;
   analyzing color distribution of the first overlapping region to acquire at least one first base color value;

analyzing color distribution of the second overlapping region to acquire at least one second base color value; and setting a ratio of the at least one first base color value to the at least one second base color value as a luminance compensation value used for adjusting pixels of the second image without adjustment of the first image when the at least one first base color value is greater than the at least one second base color value.

2. The image calibration method of claim 1, wherein comparing the first image with the second image to acquire the first overlapping region and the second overlapping region comprises:

acquiring at least one first computed value of one first pixel unit and an adjacent first pixel unit inside the first overlapping region;

acquiring at least one second computed value of one second pixel unit and an adjacent second pixel unit whose positions correspond to positions of the first pixel unit and the adjacent first pixel unit inside the second overlapping region; and determining coordinates of the first pixel unit inside the first overlapping region is matched with coordinates of the second pixel unit inside the second overlapping region when difference between the at least one first computed value and the corresponding at least one second computed value is smaller than a predefined threshold.

3. The image calibration method of claim 2, further comprising:

computing a number of the first pixel unit whose coordinates inside the first overlapping region matched with the coordinates of the second pixel unit inside the second overlapping region; and setting a weighting value according to a ratio of the computed number to a total number of pixel units inside the first overlapping region for adjusting the luminance compensation value.

4. The image calibration method of claim 1, wherein the at least one first base color value and the at least one second base color value are luminance compensation values computed by three base color values of the color distribution via specific proportion.

5. The image calibration method of claim 1, further comprising:

computing a first aberration ratio of the at least one first base color value to another first base color value inside the first overlapping region;

computing a second aberration ratio of the at least one second base color value to another second base color value inside the second overlapping region;

acquiring an aberration compensation value via the first aberration ratio and the second aberration ratio; and utilizing the aberration compensation value to adjust the another first base color value of the first image and the another second base color value of the second image.

6. The image calibration method of claim 5, wherein the at least one first base color value and the another first base color value respectively are a green color value and a red color value of the color distribution, or respectively are the green color value and a blue color value of the color distribution, and color of the at least one first base color value and the another first base color value is the same as color of the at least one second base color value and the another second base color value.

7. An image calibration method, comprising:

comparing a first image with a second image to acquire a first overlapping region of the first image and a second overlapping region of the second image, wherein the first overlapping region is overlapped with the second overlapping region;

computing a first aberration ratio of two first base color values with different colors of each pixel inside the first overlapping region;

computing a second aberration ratio of two second base color values with different colors of a corresponding pixel inside the second overlapping region;

acquiring an aberration compensation value via the first aberration ratio and the second aberration ratio; and utilizing the aberration compensation value to adjust only one of the foresaid two first base color values from a plurality of first base color values contained by the first image and further adjust only one of the foresaid two second base color values from a plurality of second base color values contained by the second image;

wherein the first selected base color and the second selected base color value have the same color.

8. The image calibration method of claim 7, wherein comparing the first image with the second image to acquire the first overlapping region and the second overlapping region comprises:

acquiring at least one first computed value of one first pixel unit and an adjacent first pixel unit inside the first overlapping region;

acquiring at least one second computed value of one second pixel unit and an adjacent second pixel unit whose positions correspond to positions of the first pixel unit and the adjacent first pixel unit inside the second overlapping region; and determining coordinates of the first pixel unit inside the first overlapping region is matched with coordinates of the second pixel unit inside the second overlapping region when difference between the at least one first computed value and the corresponding at least one second computed value is smaller than a predefined threshold.

9. The image calibration method of claim 8, further comprising:

computing a number of the first pixel unit whose coordinates inside the first overlapping region matched with the coordinates of the second pixel unit inside the second overlapping region; and setting a weighting value according to a ratio of the computed number to a total number of pixel units inside the first overlapping region for adjusting the aberration compensation value.

10. The image calibration method of claim 7, wherein the two first base color values respectively are a green color value and a red color value, or respectively are the green color value and a blue color value, and color of the two first base color values are the same as color of the two second base color values.

11. An image calibration device, comprising:

an image receiver adapted to receive a first image and a second image; and an operational processor electrically connected to the image receiver, and adapted to compare a first image with a second image to acquire a first overlapping region of the first image and a second overlapping region of the second image, analyze color distribution of the first overlapping region to acquire at least one first base color value, analyze color distribution of the second overlapping region to acquire at least one second base color value, and set a ratio of the at least one first base color value to the at least one second base color value as a luminance compensation value used for adjusting pixels of the second image without adjustment of the first image when the at least one first base color value is greater than the at least one second base color value;

wherein the first overlapping region is overlapped with the second overlapping region.

12. The image calibration device of claim 11, wherein the operational processor is adapted to further acquire at least one first computed value of one first pixel unit and an adjacent first pixel unit inside the first overlapping region, acquire at least one second computed value of one second pixel unit and an adjacent second pixel unit whose positions correspond to positions of the first pixel unit and the adjacent first pixel unit inside the second overlapping region, and determine coordinates of the first pixel unit inside the first overlapping region is matched with coordinates of the second pixel unit inside the second overlapping region when difference between the at least one first computed value and the corresponding at least one second computed value is smaller than a predefined threshold.

13. The image calibration device of claim 12, wherein the operational processor is adapted to further compute a number of the first pixel unit whose coordinates inside the first overlapping region matched with the coordinates of the second pixel unit inside the second overlapping region, and set a weighting value according to a ratio of the computed number to a total number of pixel units inside the first overlapping region for adjusting the luminance compensation value.

14. The image calibration device of claim 11, wherein the at least one first base color value and the at least one second base color value are luminance compensation values computed by three base color values of the color distribution via specific proportion.

15. The image calibration device of claim 11, wherein the operational processor is adapted to further compute a first aberration ratio of the at least one first base color value to another first base color value inside the first overlapping region, compute a second aberration ratio of the at least one second base color value to another second base color value inside the second overlapping region, acquire an aberration compensation value via the first aberration ratio and the second aberration ratio, and utilize the aberration compensation value to adjust the another first base color value of the first image and the another second base color value of the second image.

16. The image calibration device of claim 15, wherein the at least one first base color value and the another first base color value respectively are a green color value and a red color value of the color distribution, or respectively are the green color value and a blue color value of the color distribution, and color of the at least one first base color value and the another first base color value is the same as color of the at least one second base color value and the another second base color value.

17. An image calibration device, comprising:
an image receiver adapted to receive a first image and a second image; and
an operational processor electrically connected to the image receiver, and adapted to compare a first image with a second image to acquire a first overlapping region of the first image and a second overlapping region of the second image, compute a first aberration ratio of two first base color values with different color of each pixel inside the first overlapping region, compute a second aberration ratio of two second base color values with different color of a corresponding pixel inside the second overlapping region, acquire an aberration compensation value via the first aberration ratio and the second aberration ratio, and utilize the aberration compensation value to respectively adjust only one of the foresaid two first base color values from a plurality of first base color values contained by the first image and further adjust only one of the foresaid two second base color values from a plurality of second base color values contained by the second image;
wherein the first overlapping region is overlapped with the second overlapping region, and the first selected base color and the second selected base color value have the same color.

18. The image calibration device of claim 17, wherein the operational processor is adapted to further acquire at least one first computed value of one first pixel unit and an adjacent first pixel unit inside the first overlapping region, acquire at least one second computed value of one second pixel unit and an adjacent second pixel unit whose positions correspond to positions of the first pixel unit and the adjacent first pixel unit inside the second overlapping region, and determine coordinates of the first pixel unit inside the first overlapping region is matched with coordinates of the second pixel unit inside the second overlapping region when difference between the at least one first computed value and the corresponding at least one second computed value is smaller than a predefined threshold.

19. The image calibration device of claim 18, wherein the operational processor is adapted to further compute a number of the first pixel unit whose coordinates inside the first overlapping region matched with the coordinates of the second pixel unit inside the second overlapping region, and set a weighting value according to a ratio of the computed number to a total number of pixel units inside the first overlapping region for adjusting the aberration compensation value.

20. The image calibration device of claim 17, wherein the two first base color values respectively are a green color value and a red color value, or respectively are the green color value and a blue color value, and color of the two first base color values are the same as color of the two second base color values.

* * * * *